(12) United States Patent
Sterling et al.

(10) Patent No.: US 12,553,522 B1
(45) Date of Patent: Feb. 17, 2026

(54) ELECTRIC ACTUATOR FOR SINGLE AND DOUBLE FLAP DUST VALVES

(71) Applicant: Plattco Corporation, Plattsburgh, NY (US)

(72) Inventors: Alex Sterling, Champlain, NY (US); Kevin Guay, Altona, NY (US)

(73) Assignee: Plattco Corporation, Plattsburgh, NY (US)

( * ) Notice: Subject to any disclaimer, the term of this patent is extended or adjusted under 35 U.S.C. 154(b) by 261 days.

(21) Appl. No.: 17/957,189

(22) Filed: Sep. 30, 2022

Related U.S. Application Data

(60) Provisional application No. 63/250,732, filed on Sep. 30, 2021.

(51) Int. Cl.
*F16K 1/20* (2006.01)
*F16K 31/04* (2006.01)
*F15B 15/06* (2006.01)

(52) U.S. Cl.
CPC .......... *F16K 1/2007* (2013.01); *F16K 1/2028* (2013.01); *F16K 31/043* (2013.01); *F15B 15/066* (2013.01)

(58) Field of Classification Search
CPC ........ F16K 3/04; F16K 1/2007; F16K 1/2057; F16K 1/2028; F16K 31/04–055; F16K 31/521; F16K 31/522; F16K 31/523; F16K 31/5282; F16K 31/5284; F16K 31/52458; F16K 31/14; F16K 31/143; F16K 31/145; F16K 31/563; F16K 31/043; F16K 35/025; F16K 17/168; F16K 17/386; F16K 31/52441; F16K 31/045; Y10T 137/0514; Y10T 74/19767; Y10T 74/20504; Y10T 137/8292; Y10T 74/18752; Y10T 403/32451; Y10T 403/32606; Y10T 74/90504; Y10T 74/18984; Y10T 74/18888; Y10T 74/1896; Y10T 74/18936; Y10T 74/18928; Y10T 74/18968; Y10T 74/18944; F16H 25/2214; F16H 37/122; F16H 25/2021; F15B 15/066
USPC ... 251/228, 213–317.1, 129.11–129.13, 229, 251/298, 360, 118, 58, 56, 59, 249–280; 74/104, 105, 412 R–412 TA, 89–89.22; 222/504, 505, 556; 137/630.15, 630.14, 137/315.01, 315.31, 315.16, 613
See application file for complete search history.

(56) References Cited

U.S. PATENT DOCUMENTS

| | | | | |
|---|---|---|---|---|
| 112,450 | A | * 3/1871 | Haas | F16K 31/53 251/249.5 |
| 889,282 | A | * 6/1908 | Webster | F16K 31/05 74/89.45 |
| 1,033,577 | A | * 7/1912 | Gille | F23L 15/02 251/215 |

(Continued)

*Primary Examiner* — Craig J Price
(74) *Attorney, Agent, or Firm* — Downs Rachlin Martin PLLC

(57) ABSTRACT

Electric actuators for flap valves such as double flap dust valves for controlling the conveyance of abrasive particles are disclosed. Embodiments if electric actuators disclosed include a lead screw driven by a stepper motor. The lead screw includes a slider assembly that engages a yoke with a cam and causes the yoke to move through a preset angle while holding the yoke at angular positions corresponding open and closed positions of the flap valve. The yoke includes a connection to the flap valve actuator shaft.

19 Claims, 6 Drawing Sheets

(56) References Cited

U.S. PATENT DOCUMENTS

| | | | | |
|---|---|---|---|---|
| 1,441,784 A * | 1/1923 | Clayton | F16K 1/12 | 251/266 |
| 1,931,048 A * | 10/1933 | Wiener | F16K 5/0407 | 251/249.5 |
| 2,043,863 A * | 6/1936 | Nordstrom | F16K 5/222 | 251/249.5 |
| 2,149,680 A * | 3/1939 | Jewell | B01D 24/48 | 210/290 |
| 2,157,263 A * | 5/1939 | Johnson | F16K 31/54 | 74/79 |
| 2,184,513 A * | 12/1939 | Clade | F16K 31/535 | 251/249.5 |
| 2,269,382 A * | 1/1942 | Schmidt | G05D 13/00 | 137/411 |
| 2,327,425 A * | 8/1943 | Hilker | F16K 5/162 | 74/22 R |
| 2,383,549 A * | 8/1945 | Hilker | F16K 5/162 | 74/22 R |
| 2,466,779 A * | 4/1949 | Pevney | B64D 13/02 | 251/263 |
| 3,043,160 A * | 7/1962 | Killian | F16K 31/502 | 74/89.45 |
| 3,063,298 A * | 11/1962 | Elliott | F16K 31/502 | 74/509 |
| 3,146,681 A * | 9/1964 | Sheesley | F15B 15/066 | 92/138 |
| 3,147,766 A * | 9/1964 | Herring | F16K 31/535 | 74/509 |
| 3,204,920 A * | 9/1965 | Generke | F16K 31/1635 | 74/105 |
| 3,395,886 A * | 8/1968 | Fawkes | F16K 1/221 | 29/521 |
| 3,452,766 A * | 7/1969 | Fenster | F16K 3/0254 | 137/315.35 |
| 3,452,961 A * | 7/1969 | Forsman | F16K 31/1635 | 74/105 |
| 3,640,140 A * | 2/1972 | Gulick | F16H 25/2204 | 251/71 |
| 3,651,711 A * | 3/1972 | Greenwood | F16H 25/20 | 74/625 |
| 3,877,677 A * | 4/1975 | Daghe | F16K 31/502 | 251/285 |
| 3,927,573 A * | 12/1975 | Sheesley | F16H 21/44 | 74/50 |
| 4,007,910 A * | 2/1977 | Yasuoka | F16K 31/54 | 251/308 |
| 4,023,432 A * | 5/1977 | Killian | F16D 3/265 | 74/89.36 |
| RE29,253 E * | 6/1977 | Daghe | F16K 31/055 | 251/228 |
| 4,050,670 A * | 9/1977 | Borg | F16K 31/145 | 251/231 |
| 4,075,898 A * | 2/1978 | Carlson, Jr. | F16K 31/502 | 74/89.36 |
| 4,085,624 A * | 4/1978 | Nomura | F16H 25/20 | 74/89.45 |
| 4,170,169 A * | 10/1979 | Shafer | F16K 31/1635 | 92/138 |
| 4,261,546 A * | 4/1981 | Cory | F16K 31/1655 | 74/105 |
| 4,354,396 A * | 10/1982 | Charles | F16H 25/20 | 74/89.33 |
| 4,533,113 A * | 8/1985 | Francart, Jr. | F16K 5/0242 | 74/105 |
| 4,546,787 A * | 10/1985 | Meyers | F16K 31/54 | 251/249 |
| 4,625,758 A * | 12/1986 | Murray | F16K 31/502 | 137/554 |
| 4,660,428 A * | 4/1987 | Payne | F16H 37/122 | 74/89.37 |
| 4,693,128 A * | 9/1987 | Plow | F16H 25/20 | 74/89.33 |
| 4,697,468 A * | 10/1987 | Bergstrand | F16H 21/44 | 74/108 |
| 4,715,580 A * | 12/1987 | Mueller | F16K 31/045 | 74/89.45 |
| 4,882,977 A * | 11/1989 | Himeno | F01B 31/12 | 92/138 |
| 4,945,949 A | 8/1990 | Carpentier | | |
| 4,961,538 A * | 10/1990 | Hewitt | F16K 1/221 | 239/582.1 |
| 5,052,424 A * | 10/1991 | Zerndt | F16K 31/043 | 310/68 B |
| 5,085,401 A * | 2/1992 | Botting | F16K 31/522 | 74/89.32 |
| 5,169,121 A * | 12/1992 | Blanco | F24F 13/1426 | 310/68 B |
| 5,249,761 A * | 10/1993 | Schroppel | F42B 10/64 | 244/99.2 |
| 5,255,882 A * | 10/1993 | Schroppel | F16H 25/2015 | 74/89.37 |
| 5,305,985 A * | 4/1994 | Fendley | B65D 90/623 | 251/86 |
| 5,327,062 A * | 7/1994 | Byers | B23Q 1/4804 | 318/687 |
| 5,353,902 A * | 10/1994 | Flowtow | F16D 28/00 | 192/99 S |
| 5,417,083 A * | 5/1995 | Eber | F16K 31/041 | 251/285 |
| 5,822,984 A * | 10/1998 | Park | F16K 1/2078 | 251/303 |
| 6,543,747 B2 * | 4/2003 | Buchwald | F16K 31/528 | 251/304 |
| 6,990,873 B2 * | 1/2006 | Rennen | F16K 31/043 | 185/11 |
| 7,025,328 B2 * | 4/2006 | Ulicny | F24F 13/1426 | 251/250.5 |
| 7,182,314 B2 * | 2/2007 | Harvey | F16K 31/043 | 251/305 |
| 7,303,180 B1 * | 12/2007 | O'Shea | F16K 31/502 | 251/285 |
| 7,426,939 B2 * | 9/2008 | Jorg | F16K 11/076 | 438/935 |
| 7,703,180 B2 * | 4/2010 | Raccosta | A44B 17/0052 | 24/94 |
| 8,087,316 B2 * | 1/2012 | Holtgraver | F16K 31/1635 | 74/50 |
| 8,863,596 B2 * | 10/2014 | Holtgraver | F16K 31/1635 | 74/49 |
| 9,103,421 B2 * | 8/2015 | Lobo | F16K 31/53 | |
| 9,175,786 B2 * | 11/2015 | Luebbers | F16K 31/502 | |
| 9,593,751 B2 * | 3/2017 | Lee | B60Q 1/076 | |
| 9,599,231 B2 | 3/2017 | Surprenant et al. | | |
| 10,040,539 B2 * | 8/2018 | Antunes | F16H 25/2472 | |
| 10,094,299 B2 * | 10/2018 | Raimbault | F02D 9/1005 | |
| 10,132,418 B2 * | 11/2018 | Diaz | F16K 15/035 | |
| 10,323,759 B2 * | 6/2019 | Tanner | F16K 1/205 | |
| 10,563,748 B2 * | 2/2020 | Morgan | F16H 57/039 | |
| 10,927,962 B1 * | 2/2021 | Hurst | F16K 31/047 | |
| 10,967,950 B2 * | 4/2021 | Liu | F16K 1/32 | |
| 11,078,997 B2 * | 8/2021 | Forrester, Jr. | F16H 7/02 | |
| 11,149,874 B1 * | 10/2021 | Spears | F16K 31/535 | |
| 11,156,275 B2 * | 10/2021 | Yamaguchi | F16K 31/041 | |
| 11,274,749 B1 * | 3/2022 | Thurston | F16K 3/085 | |
| 11,598,427 B2 * | 3/2023 | Kennedy | F16K 1/221 | |
| 11,873,908 B2 * | 1/2024 | Kennedy | F16K 31/535 | |
| 11,946,566 B2 * | 4/2024 | Schifrin | F16K 31/52441 | |
| 12,038,099 B1 * | 7/2024 | Kennedy | F16K 1/221 | |
| 12,196,336 B2 * | 1/2025 | Yakos | F16K 31/0668 | |
| 12,287,044 B2 * | 4/2025 | Smith | F16K 37/0041 | |
| 2003/0136930 A1 * | 7/2003 | Dowden | F16K 31/5282 | 74/10.9 |
| 2005/0061366 A1 * | 3/2005 | Rademacher | F16K 17/36 | 137/68.14 |
| 2008/0173838 A1 * | 7/2008 | Schmidig | F24F 13/1426 | 251/129.11 |
| 2009/0301579 A1 * | 12/2009 | Wong | F16K 31/046 | 137/565.13 |

(56) References Cited

U.S. PATENT DOCUMENTS

| | | | | |
|---|---|---|---|---|
| 2010/0090147 | A1* | 4/2010 | Recio | F02D 41/2464 |
| | | | | 251/249.5 |
| 2010/0127022 | A1* | 5/2010 | Valella | F16K 5/0407 |
| | | | | 251/304 |
| 2015/0047715 | A1* | 2/2015 | Foster | F16K 27/0227 |
| | | | | 137/68.14 |
| 2015/0226341 | A1* | 8/2015 | Broome | F16K 31/535 |
| | | | | 251/315.1 |
| 2017/0232285 | A1* | 8/2017 | Magee | F16K 31/521 |
| | | | | 137/554 |
| 2018/0292012 | A1* | 10/2018 | Kwasniewski | F16K 31/54 |
| 2019/0072200 | A1* | 3/2019 | Chen | F16K 37/0083 |
| 2022/0260084 | A1* | 8/2022 | Mariano | F04D 27/0269 |

\* cited by examiner

ELECTRIC ACTUATOR FOR SINGLE AND DOUBLE FLAP DUST VALVES

RELATED APPLICATION DATA

The present application claims priority to U.S. Provisional Application No. 63/250,732, filed Sep. 30, 2021, entitled "Electric Actuator For Double Flap Dust Valve," which is incorporated by reference herein in its entirety.

FIELD OF THE DISCLOSURE

The present disclosure relates to electric actuators for flap-gate valves for conveyance of abrasive materials and the like, and more particularly to electric actuators for double flap dust valves.

BACKGROUND

Double flap dust valves are a well-known mechanism for control dry material conveyance systems and are particularly well-suited for use in conveyance of materials comprising abrasive particles. Examples of such dust valves have been patented in the past by the present Applicant, including U.S. Pat. No. 4,945,949, entitled "Reduce Height Dust Valve," and U.S. Pat. No. 9,599,231, entitled "Double Flap Valve With Quick-Change Replaceable Wear Surface." Each of these patents in incorporated herein by reference in its entirety.

While double flap dust valves of the type described in the foregoing patents have met with great success, conventionally the use of pneumatic actuators has limited use of such valves in some environments. Previous attempts at alternative actuation means to broaden the range of application of these valves have not met with success. Commercially available electric rotary actuators are insufficient for the high-demand environments in which this type of valve typically operates. There therefore remains a need in the art for alternative, non-pneumatic actuation means for such valves.

SUMMARY OF THE DISCLOSURE

In one implementation, the present disclosure is directed to an electric actuator for flap valves. The electric actuator for flap valves includes an actuator housing; an electric motor supported on the housing; a lead screw in the housing driven by the electric motor; a slider on the lead screw translating in response to rotation of the lead screw; and a yoke including a torque-transferring connection connectable to an actuating shaft of a flap valve, wherein the yoke is pivotably mounted on the housing and driven through a pre-set travel arc by engagement with the slider.

In another implementation, the present disclosure is directed to a flap valve system. The flap valve system includes a lead screw disposed along a lead screw axis; a stepper motor rotationally driving the lead screw between first and second angular positions; a slider disposed on the lead screw configured to translate along the lead screw axis between a closed position at the first angular position and an open position at the second angular position in response to rotation of the lead screw; a yoke pivotally mounted on a shaft axis perpendicular to the lead screw axis, the yoke being driven by the slider through a preset arc in response to rotation of the lead screw; and a valve actuator shaft connector rotatable by the yoke to move a flap valve actuator shaft between open and closed positions.

In yet another implementation, the present disclosure is directed to a double flap dust valve system with electric actuation. The double flap dust valve system with electric actuation includes a first and second flap valves mounted one on top of the other, each said flap valve comprising a flap valve body defining a valve seat closed by a valve closure plate, and a valve closure control arm linked to the valve closure plate and driven by a valve actuator shaft; first and second electric valve actuators, each said electric valve actuator comprising an actuator housing mounted to the valve body of each of said first and second flap valves; an electric motor supported on each said actuator housing having a motor shaft extending into the housing; a lead screw mounted in each said actuator housing coupled respectively to said motor shafts on one end and supported on an opposite end by a shaft bearing mounted on an opposite actuator housing wall; a slider on each respective lead screw translating in response to rotation of the lead screw, the sliders each comprising a slider body defining a central opening through which the lead screw is received, arms extending perpendicularly from opposite sides of the slider body perpendicular, and a cam follower disposed on each said extending arm; and a yoke pivotably mounted in each actuator housing and driven through a pre-set travel arc by engagement with the slider, the yoke comprising a yoke body, a pair of downwardly extending legs on each side of the yoke body positioned to lie on opposite sides of the lead screw, each pair of legs defining a U-shaped slot configured to receive one said cam follower, and a cylindrical protrusion from each side of the yoke body above said U-shaped slots, the cylindrical protrusions forming pivot points received in the walls of each respective actuator housing and connected to the valve actuator shaft of each respective flap valve.

BRIEF DESCRIPTION OF DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
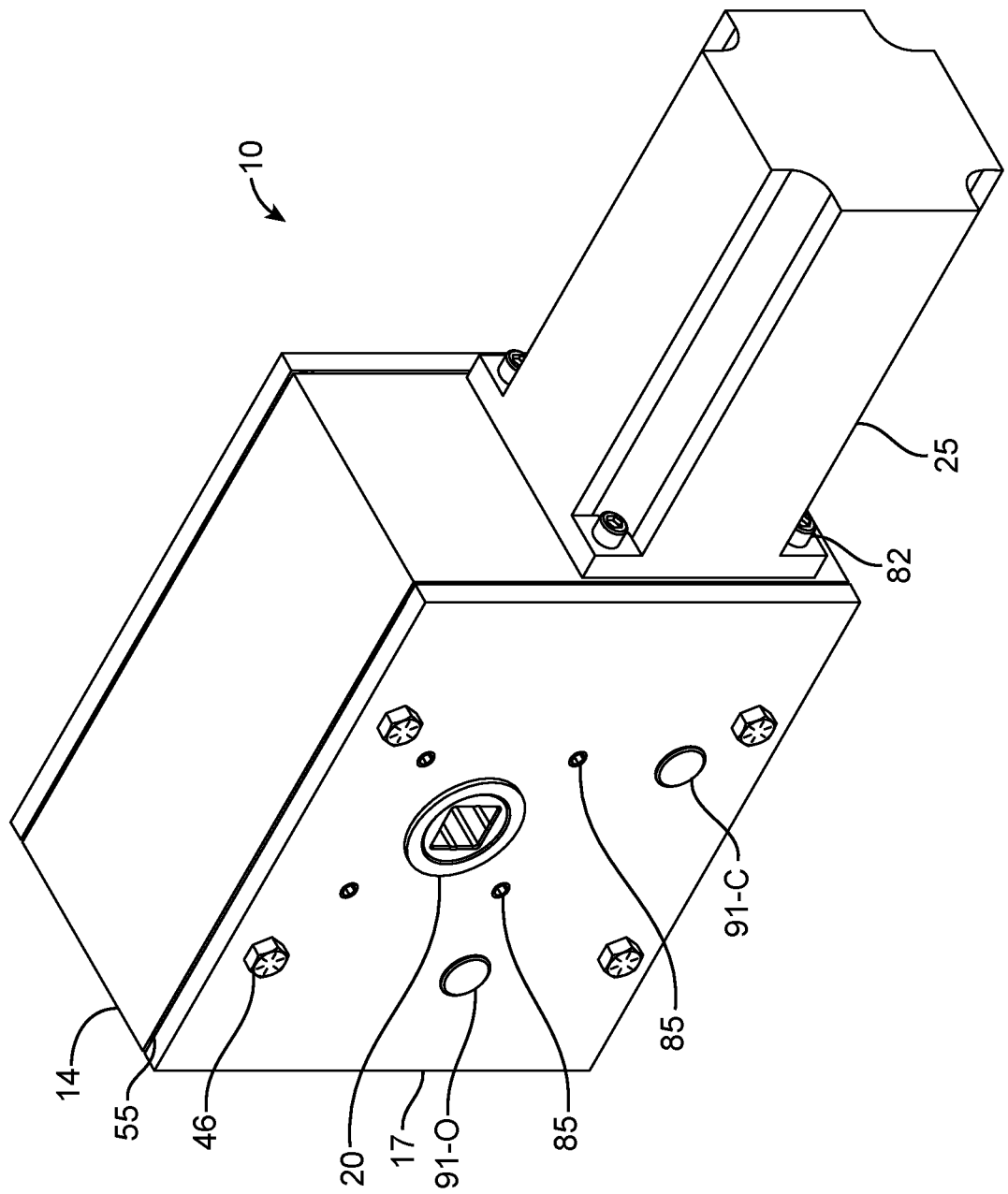
FIG. 1 is a perspective view of an electric actuator for double flap dust valves according to an embodiment of the present disclosure.

An example of an electric actuator 10 for an abrasive materials flap valve, such as a double flap dust valve (see, e.g., FIG. 11) and similar types of valves, is shown in FIGS. 1-7. As shown therein, an embodiment of electric actuator 10 may comprise housing 14 with stepper motor 25 attached thereto via motor mount screws 82, lock washers 76 and nuts 79 (see FIG. 3). Housing 14 includes detachable side plates 17 attached by cover screws 46. When actuator 10 is to be used in harsh environments, such as including exposure to fine abrasive particles, cover gaskets 55 may be provided to seal side plates 17 to housing 14. Side plates 17, secured to housing 14 by cover screws 46, provide access internally (see FIG. 2) to drive shaft 26 of motor 25, which is coupled to lead screw 67 by shaft coupler 28 (see FIG. 4). A key 70 is provided in shaft coupler 28 to ensure indexing is maintained between the motor shaft and lead screw. Bushings 20 are mounted in side plates 17 to support valve shaft couplings 32 (see FIG. 6) as further described below. Actuator mounting holes 85 and limit switch mounting holes 91 are also provided in side plates 17.

Figure 2:
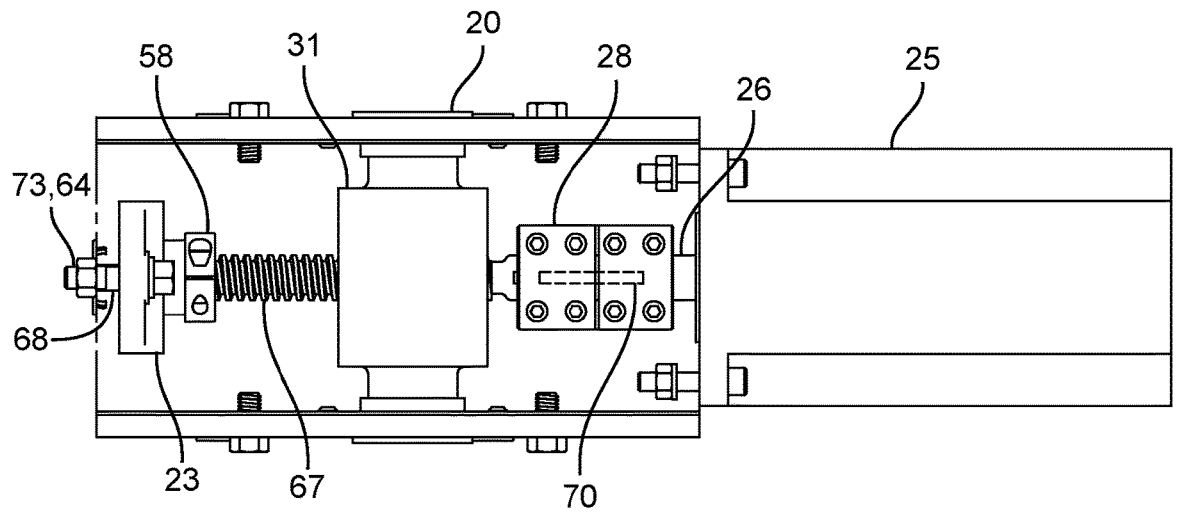
FIG. 2 is a top section view thereof.
Figure 5:
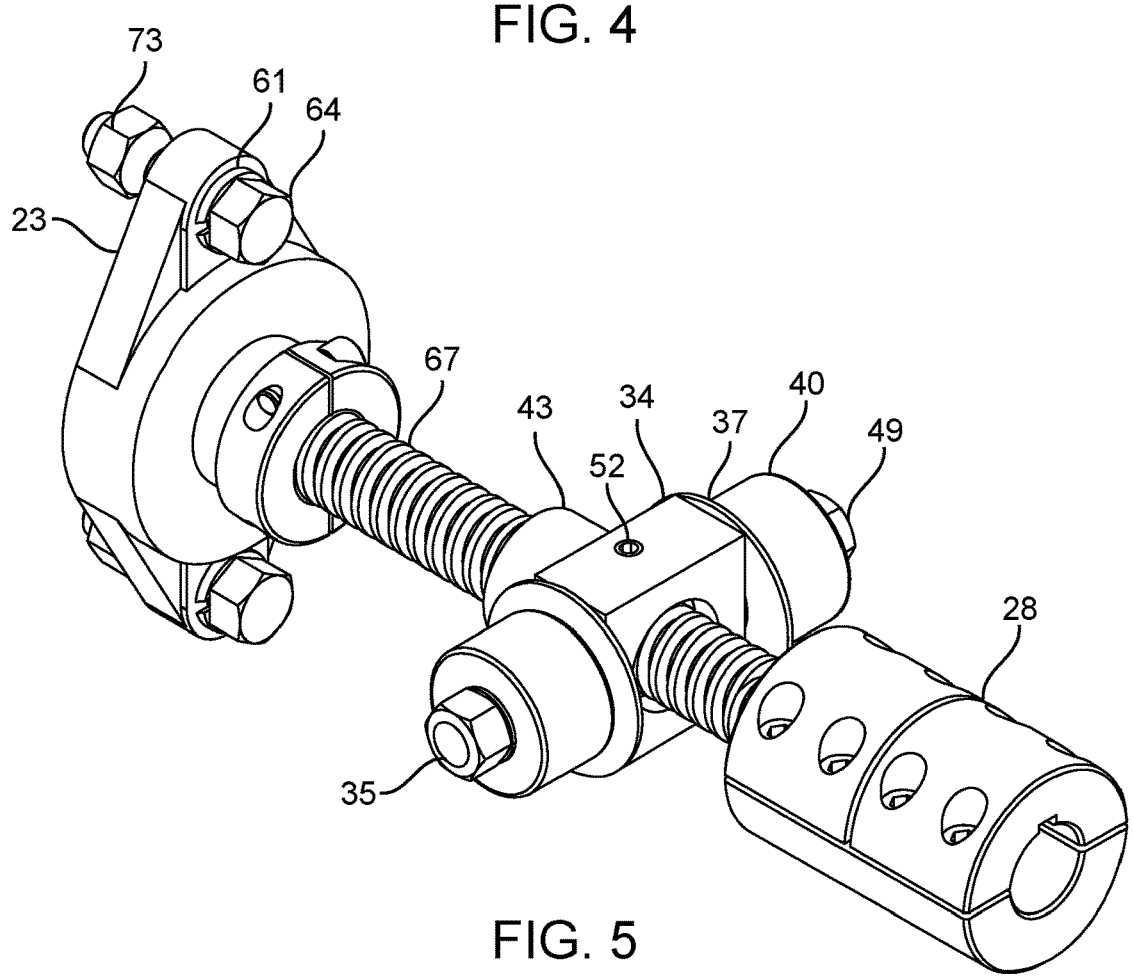
FIG. 5 is a perspective view of a lead screw assembly according to an embodiment of the present disclosure.
Figure 6:
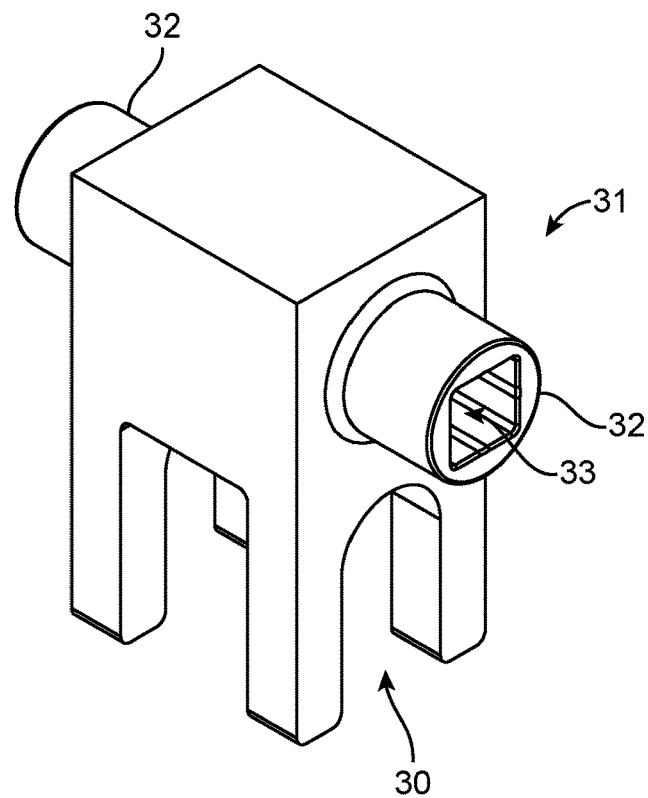
FIG. 6 is a detailed, perspective view of a yoke utilized in embodiments disclosed herein.
Figure 7:
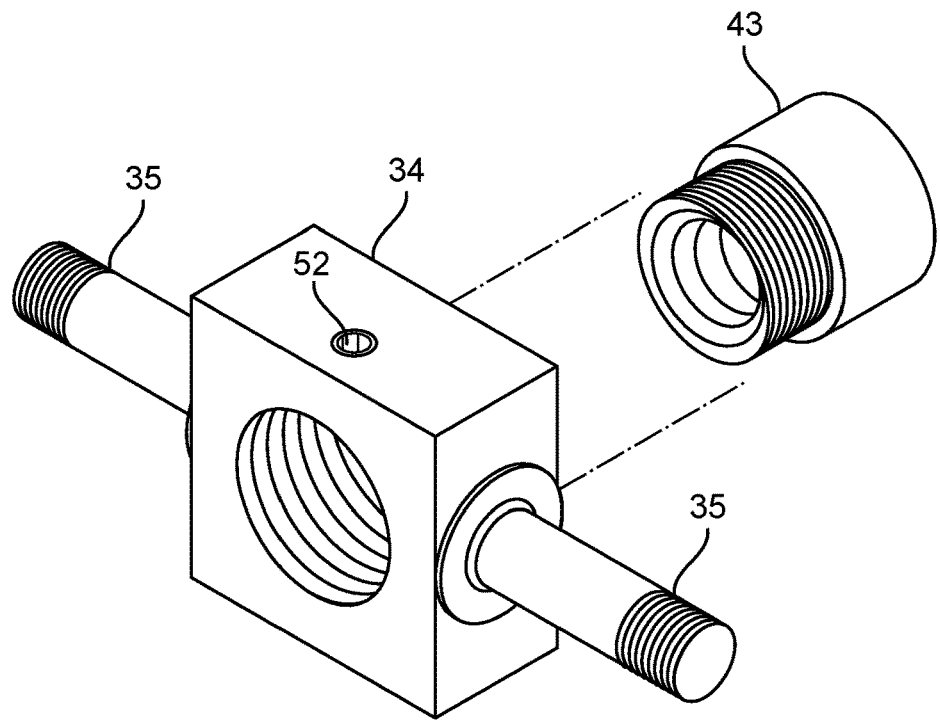
FIG. 7 is a detailed, perspective view of a slider utilized in embodiments disclosed herein.
Figure 8:
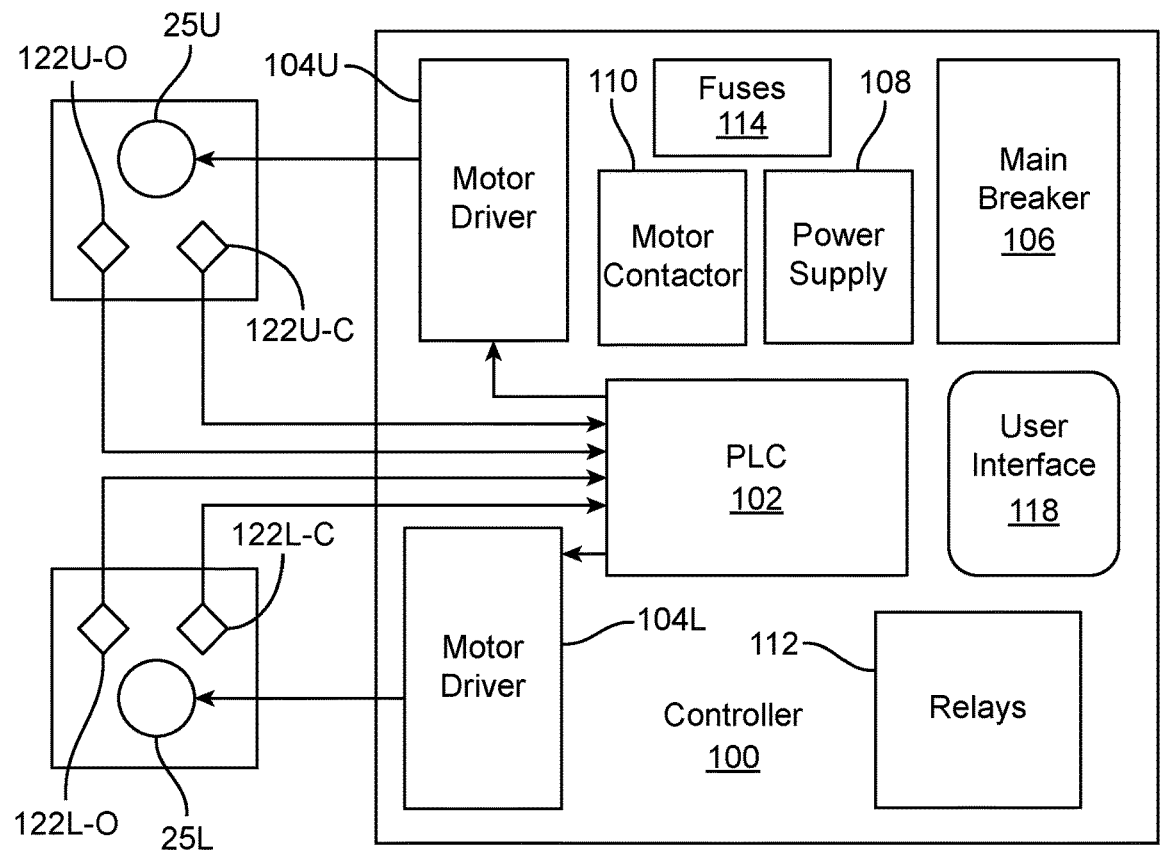
FIG. 8 is a block diagram illustrating an embodiment of a control system according to the present disclosure.

As best seen in FIGS. 2 and 5, lead screw 67 is supported on the housing wall opposite motor 25 by shaft bearing 23 with shaft collar 58. Shaft bearing 23 is attached to the wall by bearing screws 64 and bearing nuts 73 with bearing washers 61. Traveling nut 43 on lead screw 67 translates and moves slider 34 when the lead screw is rotated by the motor. In one embodiment, travelling nut 43 may be provided as a threaded insert into slider 34, which is secured by set screw 52. In an alternative embodiment, mating internal lead screw threads may be cut directly into the opening of slider 34. An acme lead screw and acme nut may be used, or other suitable lead or power screw designs also may be employed. Hex drive 68 on the end of lead screw 67 allows for manual operation of the lead screw and is accessible via an opening in the housing wall sealed by dust cap 88. In one example, ten rotations of lead screw 67 are required for full travel of slider 34.

Slider 34 has two shaft arms 35 with threaded ends (see FIG. 7) extending in opposite directions perpendicular to the lead screw. The shaft arms each carry a cam follower 40 on opposite sides of the slider. Cam followers 40 are spaced from the body of slider 34 by washer-like spacers 37 and retained on threaded slider arms 35 by cam follower nuts 49. Cam followers 40 are also received in U-shaped slots 30 in yoke 31, which sits over slider 34. Yoke 31 rotates around valve shaft couplings 32 formed as cylindrical protrusions on opposite sides of the yoke. Shaft couplings 32 are supported by bushings 20 mounted in the sides of the housing above the lead screw. In one embodiment, valve shaft couplings 32 are formed with a square drive sockets 33, although any suitable torque-transferring connector may be used.

When slider 34 translates along lead screw 67, cam followers 40 engage yoke 31, causing the yoke to rotate through approximately a 45 degree angle. Rotation of the yoke rotates the torque-transferring valve shaft couplings 32. Valve shaft couplings 32 are connected to actuating shaft 128 of flap valve, such as flap valves 150U/L shown in FIG. 11 (see also, actuating shaft 28 shown in incorporated-by-reference U.S. Pat. No. 4,945,949).

Figure 3:
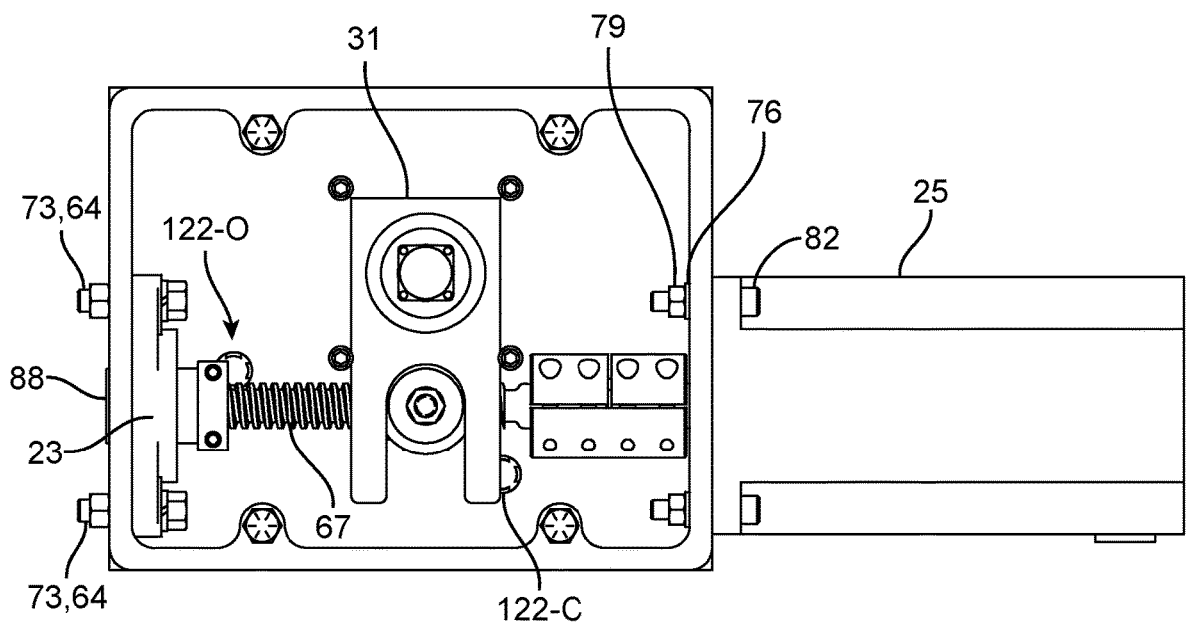
FIG. 3 is a side section view thereof.
Figure 4:
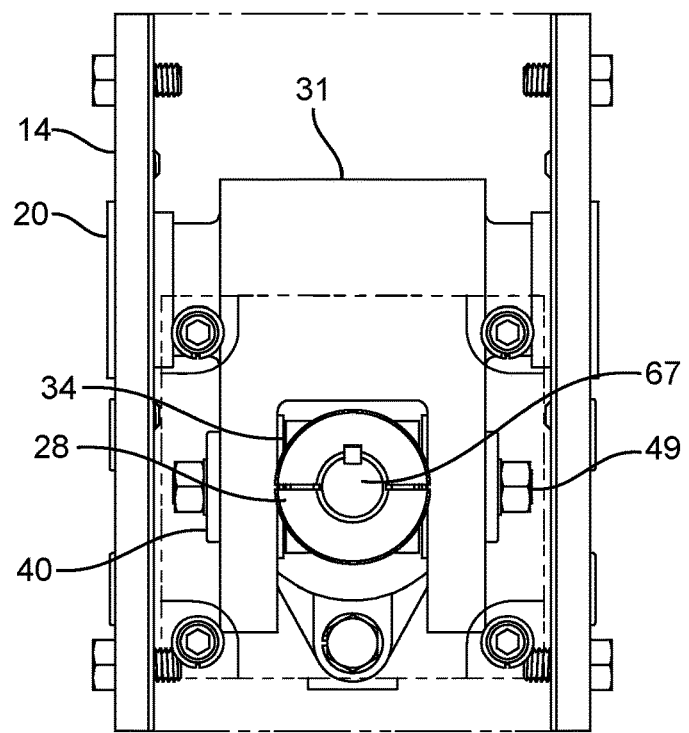
FIG. 4 is an end section view thereof.

An important aspect in the operation of a flap dust valve is the ability to apply significant torque and hold the torque with the flap of the valve maintained securely against the valve seat by the force delivered from the actuator. With reference to FIG. 3, this means maintaining the yoke in the 90 degree position as shown. The 90 degree mark indication in FIG. 3 is the valve closed position. Travel through 45 degrees, i.e. clockwise rotation of the yoke as viewed in FIG. 3, corresponds to the valve open position for valves with an actuation range of 45 degrees or less. A further requirement is that the actuator have a relatively high duty cycle, cycling at 6 to 12 cycles per minute under continuous operation over extended periods of time, which conventional electric rotary actuators typically cannot reliably achieve.

In one example, an embodiment of a control package for actuator 10 comprises control unit 100 employing programmable logic controller (PLC) 102. When configured for control of a double flap dust valve, PLC 102 controls two motor drivers 104U/L, corresponding to upper motor 25U and lower motor 25L, respectively. Line-in power is provided through main breaker 106 to power supply 108. Power supply 108 will be selected as appropriate for providing power to other components of the control unit, in particular to PLC 102. It is desirable to provide a power supply with as much flexibility as possible so as to serve customers with many different power sources (one common power source is 230/460 VAC, 3-Phase, 60-Hz, however many others may be provided). Thus, in some embodiments power supply flexibility may be enhanced with an add-on box that houses either a transformer or DV power supply. In addition to main breaker 106, fuse bank 114 may be configured with fuses for each individual circuit to provide redundant overcurrent protection. Higher current power to motors 25U/L is provided through motor contactors 110, which also serve as additional circuit breaker protection for the motors. Relays 112 provide wiring connections to send and/or receive signals to/from a central control room. User interface 118 allows for user adjustability of speed, timer adjustments, opening distance, etc. In some embodiments, user interface 118 may comprise a touch screen.

Figure 9:
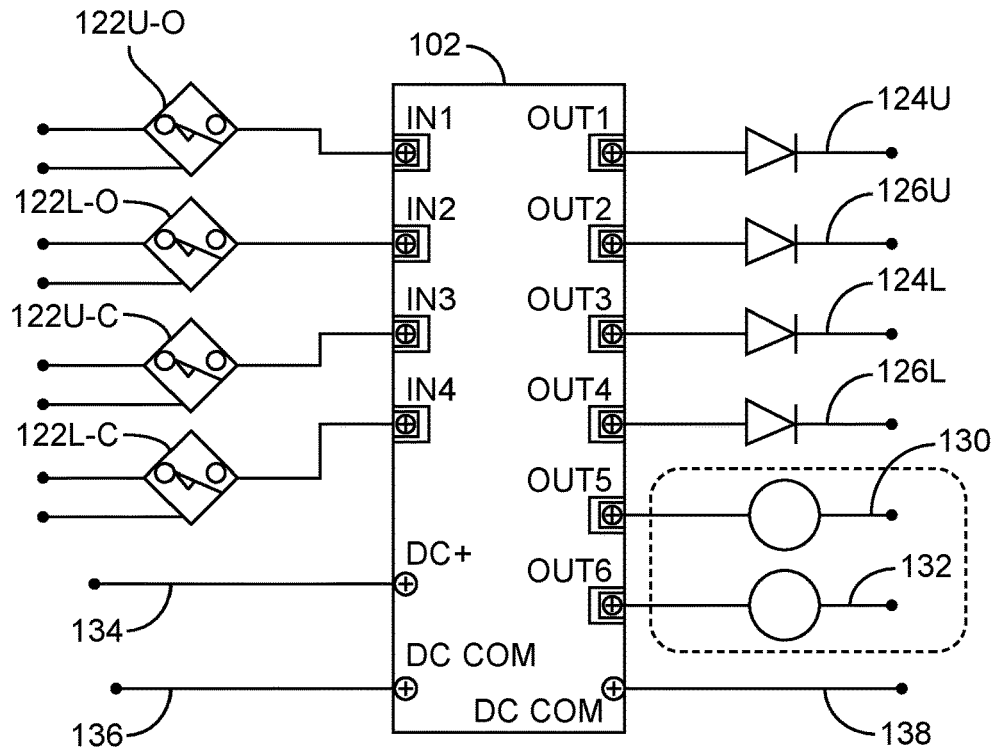
FIG. 9 is a schematic diagram illustrating connections to a programmable logic controller in one embodiment of the present disclosure.

Suitable devices to serve as PLC 102 may be selected by persons skilled in the art based on the teachings of the present disclosure. In one illustrative example, PLC 102 may comprise a Panasonic FP0R-C16P PLC coupled with user control via Panasonic touch screen GT12HMI. In this example, power supply 108 is a 24 VDC power supply. As shown in FIG. 9, PLC may be configured to receive inputs from upper valve open position limit switch 122U-O, lower valve open position limit switch 122L-O, upper valve closed position limit switch 122U-O, and lower valve closed position limit switch 122L-C, respectively. Based on factors such as desired cycle times, PLC 102 is programmed to deliver outputs for upper valve motor speed control pulses 124U, upper motor direction change 126U, upper motor speed control pulses 124L and lower motor direction change 126L, respectively, in response to signals from corresponding limit switches. As previously noted open position limit switches 122-O are mounted in actuator housing 14 at mounting hole 91-O and closed position limit switches 122-C at mounting hole 91-C (see FIGS. 1 and 3).

PLC 102 also may be configured to drive the lead screw through a pre-set angular rotation (in both rotational directions) corresponding to the rotation sufficient to move the slider between the open and closed positions of the yoke. In a further optional embodiment, PLC 102 may be configured for an open loop control mode without inputs from the limit switches wherein control is imparted only by control of the angular rotation of the lead screw. Such an open control scheme may be employed on its own, or in combination with a closed loop control using inputs from the open and closed limit switches.

PLC 102 also optionally provides fault protection via upper valve motor fault disconnect output 130 and lower valve motor fault disconnect output 132. When a fault condition such as a valve flap jam, which may, for example, be detected by motor overcurrent or time between limit switch signals, is detected, the upper or lower valve motors may be disconnected in response to fault disconnect signals. Other terminals on PLC 102 may comprise DC comm 134 and DC+ voltage 136 on the input side and DC Com on the output side 138. Outputs from PLC 102 also may optionally be provided to a central control room for control monitoring functions. In a further optional embodiment, controls may be capable of running in both open or closed loop (with or without requiring switches).

Figure 10:
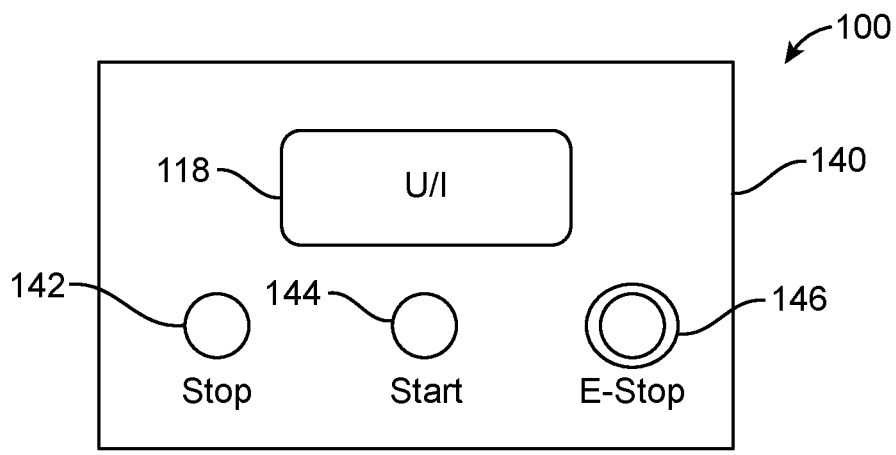
FIG. 10 is a schematic depiction of a control unit according to the present disclosure.

An example of an external configuration of control unit 100 is shown in FIG. 10. Control unit housing 140 preferably comprises an enclosure box with a minimum of NEMA 4 rating, up to a NEMA 7 rating in some embodiments. Controls on housing 140 would typically comprise, at a minimum, stop button 142, start button 144 and Emergency Stop button 146, in addition to touch screen U/I 118. Emergency Stop Button 146 kills all power coming into control unit 100. Start/stop buttons 144/142 turn the motor contactor on/off, which in the off state allows control unit 100 to be powered so as to permit entry of changes via U/I 118 without the valve actuator motors in operation. In some embodiments remote start, stop, and emergency stop controls also may be provided in a central control room to allow for remote operation.

Figure 11:
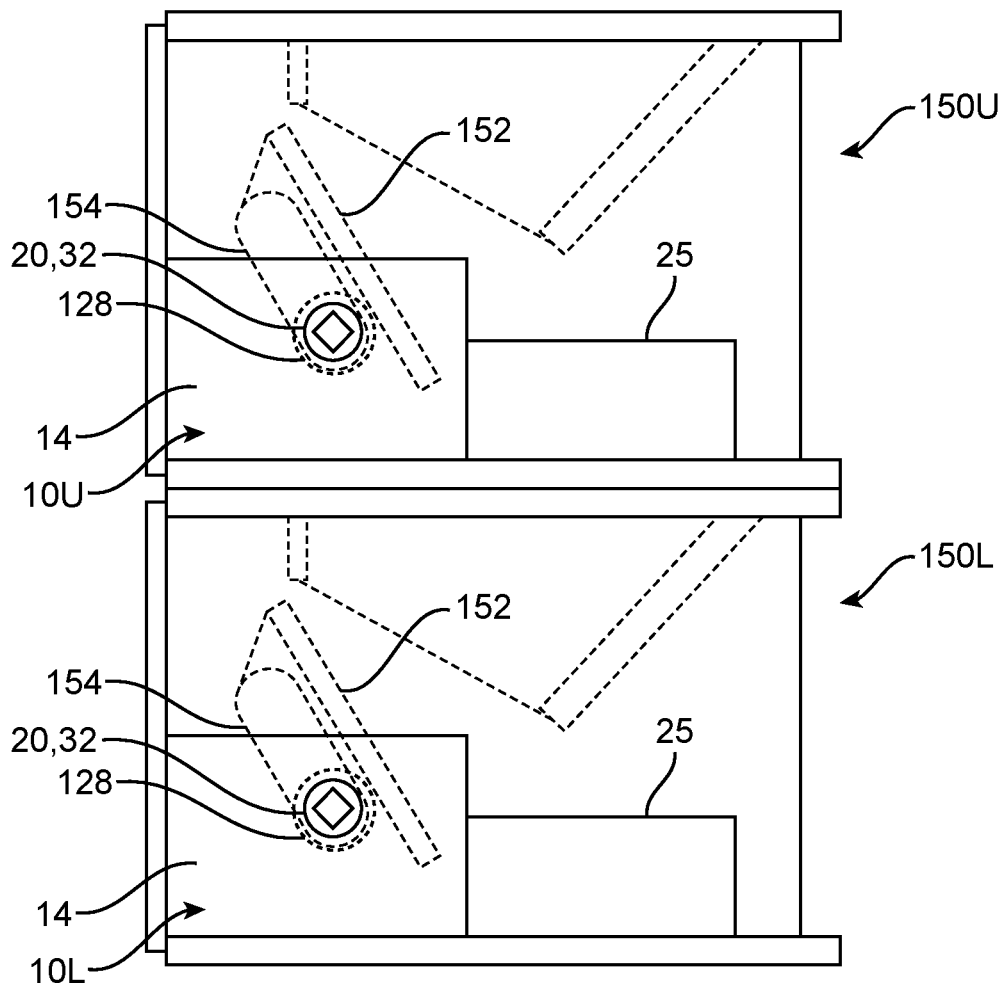
FIG. 11 is a schematic side view of a double flap dust valve utilizing electric actuators as described herein.

A typical operation sequence once valves, actuators, and controller are installed and ready to run may be as follows:
1. Central control room sends the start signal to actuator control box
2. Actuator begins the "homing" sequence, both valves completely shut
3. Valve begins normal operation until stop command is sent, loss of power, error, or mechanical issue ("Normal operation is as follows")
    a. Both valves completely shut
    b. Top valve opens to preset distance at preset speed (preset values are loaded by default but can be adjusted using the HMI)
    c. Top valve stays open for a set amount of time (user adjustable by HMI)
    d. Top valve closes to "home" position at a user adjustable speed
    e. Dwell time (user adjustable)
    f. Bottom valve opens (user adjustable)
    g. Bottom valve remains open for set time (user adjustable)
    h. Bottom valve closes (user adjustable)
    i. Dwell time (user adjustable)
    (The entire time this process runs, the switches will send open/close position feedback to the control room)
4. If the valve jams, the actuator will sense the jam (maybe using a timer to make sure the travel distance is reached in the time it should) and both the top and bottom valves will open to attempt to clear the jam, the valves will then return to normal operation. The "jam count" parameter could be set so an error message is sent out (e.g., red light turns on) if a specific number of jams (e.g., 3) happen in a row
5. If the control is in "Hand" mode, this locks out any start/stop signals from the control room and only allows the valve to be operated at the local control panel. The user can either tell the valve to fully open/close or they can jog it Example: A working example is schematically depicted in FIG. 11. As shown therein, upper and lower valves 150U/L form a double flap dust valve assembly. Key components of the flap valves include valve closure plates 152 and valve closure control arms 154 mounted on valve actuator shafts 128. Further details of this type of valve may be found in incorporated-by-reference U.S. Pat. No. 4,945,949. Upper and lower actuators 10U/L are configured as described hereinabove with respect to actuator 10 and are further configured and operate as follows:

- Approximate overall actuator dimensions are 8" wall by 6" wide by 18" deep, adapted for actuating a Plattco PCV-12" double-flap pollution control valve with a 2 psi sealing pressure. (See https://www.plattco.com/pcv-series-pollution-control-valve).
- An NEMA 42 stepper motor which provides large amounts of torque (e.g. in the range of about 20 N-m) and can be run continuously or even stalled with a load applied.
- Alloy steel ¾-5 ACME lead screw approx. 6" long with a keyed connection to the motor. A bronze traveling nut connects the slider which has two 1¼" roller bearings. These transmit the force to the 4140 steel yoke which has a center to center of approx. 2" from where the force is applied in the closed position to the center of rotation. The yoke has a 1 ⅛" dia. output with a square drive matching dimensions of standard ¼ turn pneumatic rotary actuators.
- Actuator designed to run continuously 24/7/365 at a rate of 6 cycles (1 cycle is open/close) per minute, but has been tested to up to 12 cycles per minute.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure or of the inventions as set forth in following claims.

What is claimed is:
1. An electric actuator for flap dust valves, comprising;
  an actuator housing;
  an electric motor supported on the actuator housing;
  a lead screw in the actuator housing driven by the electric motor;

a slider on the lead screw translating in response to rotation of the lead screw; and a yoke including a torque-transferring connection connectable to an actuating shaft of a flap dust valve, wherein the yoke is pivotably mounted on the actuator housing and driven through a pre-set travel arc of 45 degrees by engagement with the slider, said pre-set travel arc being between a valve closed position with the yoke positioned at 90 degrees with respect to the lead screw and an open position with the yoke positioned at 45 degrees with respect to the lead screw.

2. The electric actuator of claim 1, wherein the slider comprises:

a body defining a central opening through which the lead screw is received;

arms extending from opposite sides of the body, perpendicular to the lead screw; and a cam follower disposed on each said extending arm configured to engage the yoke.

3. The electric actuator of claim 2, further comprising a travelling nut disposed on the lead screw in engagement with the slider, wherein the lead screw acts on the travelling nut which in turn translates the slider in response thereto.

4. The electric actuator of claim 2, wherein the yoke comprises:

a yoke body;

a pair of downwardly extending legs on each side of the yoke body positioned to lie on opposite sides of the lead screw, each pair of legs defining a U-shaped slot configured to receive one said cam follower between said pair of legs through said pre-set travel arc; and a cylindrical protrusion from each side of the yoke body above said U-shaped slots, the cylindrical protrusions forming pivot points received in an actuator housing wall and forming said torque-transferring connection.

5. The electric actuator of claim 2, wherein:

the yoke comprises a pair of downwardly extending legs on each side of a yoke body, said pair of downwardly extending legs positioned to lie on opposite sides of the lead screw, each of said pair of downwardly extending legs defining a U-shaped slot with parallel side walls configured to receive one said cam follower between said parallel sidewalls through said pre-set travel arc of the yoke; and the cam followers have a center and the parallel side walls have sufficient length such that the center of the cam follower does not move beyond the parallel side walls through the pre-set travel arc of the yoke.

6. The electric actuator of claim 5, wherein the U-shaped slots of the yoke are defined by opposing side walls of said arms and said arms terminate with an end wall perpendicular to said side walls.

7. The electric actuator of claim 1, wherein:

the lead screw is supported by a shaft bearing opposite the electric motor, the shaft bearing attached to a wall of the housing and defining an opening receiving an end of the lead screw;

the lead screw has a rotary tool connector at the end received in the shaft bearing opening to permit engagement of a manual rotation tool; and the housing defines an opening aligned with the rotary tool connector configured to receive a rotary tool therethrough.

8. The electric actuator of claim 1, wherein:

said actuator further comprises a motor controller configured to drive the electric motor in opposite rotational directions through a rotation angle corresponding to the pre-set travel arc of the yoke.

9. The electric actuator of claim 8, further comprising open position and closed position limit switches positioned in the actuator housing to engage the yoke at open and closed position limits of travel and to send a signal to said motor controller indicating said positions.

10. The electric actuator of claim 9, wherein said motor controller is further configured to relay the open and closed position signals to a remote control room.

11. The electric actuator of claim 8, further comprising in combination at least one flap dust valve, wherein:

the flap dust valve comprises a flap valve body defining a valve seat closed by a valve closure plate, and a valve closure control arm linked to the valve closure plate and driven by the valve actuating shaft;

the actuator housing is mounted to the flap valve body; and the valve actuating shaft is connected to the torque-transferring connection of the yoke.

12. The electric actuator of claim 11, further comprising in combination a second said flap dust valve mounted above the first said flap dust valve to form a double flap dust valve, each said flap dust valve being controlled by one said electric actuator with the actuator housing of each said electric actuator attached to the respective valve body of Law Offices of said flap dust valves and one said motor controller controls the electric motor of each electric actuator.

13. The electric actuator of claim 8, wherein the electric motor is a stepper motor and the motor controller is a stepper motor controller.

14. The electric actuator of claim 8, wherein said motor controller and said electric motor are configured to drive the electric actuator at a duty cycle of 6 to 12 cycles per minute under continuous operation when connected to the flap dust valve.

15. An electric actuator for flap dust valves, comprising:

an actuator housing;

an electric motor supported on the actuator housing;

a lead screw in the actuator housing driven by the electric motor;

a slider on the lead screw translating in response to rotation of the lead screw, said slider having arms extending from opposite sides perpendicular to the lead screw; and a yoke including a torque-transferring connection connectable to an actuating shaft of a flap dost valve, wherein the yoke is pivotably mounted on the actuator housing and driven through an entre pre-set travel arc of 45 degrees by engagement with the slider arms, the yoke comprising a yoke body and a pair of downwardly extending legs on each side of the yoke body positioned to lie on opposite sides of the lead screw, each pair of legs defining a slot configured to receive one said slider arm between said pair of legs through said entire pre-set travel arc;

wherein said entire pre-set travel arc extends from a valve closed position with the yoke positioned at 90 degrees with respect to the lead screw and a valve open position with the yoke positioned at 45 degrees with respect to the lead screw.

16. The electric actuator of claim 15, further comprising a motor controller configured to drive the electric motor in opposition opposite rotational directions through a rotation angle corresponding to the entire pre-set travel arc of the yoke.

17. The electric actuator of claim 16, wherein said motor controller and electric motor are configured to drive the electric actuator at a duty cycle of 6 to 12 cycles per minute under continuous operation when connected to the flap dust valve.

18. The electric actuator of claim 15, wherein:
the slider further comprises a cam follower disposed on each said extending arm configured to be received in the slots of the yoke;
the slots of the yoke are defined by parallel opposing side walls of said downwardly extending arms; and
the cam followers have a center and the slots of the yoke defined by the parallel opposing side walls have sufficient length such that the center of the cam follower does not move beyond the parallel side walls through the entire pre-set travel arc of the yoke.

19. The electric actuator of claim 15, wherein the slots of the yoke are defined by opposing side walls of said arms and said arms terminate with an end wall perpendicular to said side walls.

* * * * *